2,765,318

TREATMENT OF CRUDE POLYCHLORO COPPER PHTHALOCYANINE

Peter F. Gross, Woodstown, N. J., assignor to E. I. du Pont de Nemours and Company, Wilmington, Del., a corporation of Delaware No Drawing. Application March 27, 1952, Serial No. 278,953

6 Claims. (Cl. 260—314.5)

This invention relates to a process for treatment of crude polychloro copper phthalocyanine whereby to convert the color into a fine physical form suitable for use as a pigment in paints, varnishes and inks.

In copending application of George Barnhart, Serial No. 278,969, filed simultaneously herewith, polychloro copper phthalocyanine is defined as copper phthalocyanine which has been chlorinated to a chlorine analysis of at least 47% by weight, which corresponds to at least 14 atoms of chlorine per molecule. The copending application discusses the various modes of preparing the crude color and then the need for converting it into the so-called pigmentary state. The application further discusses the methods heretofore employed or suggested for achieving this pigmentary state in phthalocyanine colors generally or in the polychloro pigment under discussion. Barnhart then describes and claims a novel method for achieving this state in an economical, efficient, and uniformly reliable manner. His method, briefly stated, consists of forming a slurry of the color in sulfuric acid of 98–99% concentration which contains further crystals of a sodium sulfate-sulfuric acid complex formed by adding to the acid a quantity of sodium sulfate, or of any equivalent salt, greater than that required to saturate the acid at the given temperature. The viscous slurry of color, complex and acid is then stirred or milled for a period of time sufficient to achieve permutoid swelling of the color, which is defined there as a physico-chemical change by virtue of which any dark, compact chunks of the color are reduced to a uniform dispersion of color particles, observable on a slide under the microscope at 100 × magnification as a uniform, green background for the relatively large, colorless crystals of the inorganic complex. When this stage is achieved, the treatment mass is diluted with water and the regenerated color is filtered off and washed.

The above process is very good as far as it goes. It achieves its principal aim, namely, conversion of the crude color into a fine physical state, characterized by good strength and brightness, soft texture, ease of incorporation into paint- or ink-vehicles, and freedom from grit. But for some obscure reason, the color appears at the end in a shade of green which is bluer than the best yellowish green shades which have been known to be obtainable from polychloro copper phthalocyanine by other subdivision processes, for instance by salt milling.

Accordingly, it is an object of this invention to improve the process of Barnhart whereby to obtain the color in yellowish green shades corresponding to the best standards of this color. Various additional objects and achievements will become apparent as the description proceeds.

Now, according to my invention, the process of Barnhart is modified to the extent of providing for the further presence in the color-acid-complex slurry of a water-insoluble, benzenoid, neutral liquid, such as nitrobenzene, xylene or ortho-dichlorobenzene. This provision can be made by incorporating the liquid in the slurry at the beginning of the process, or at any stage thereafter, even after the process of permutoid swelling has been completed, or after partial dilution of the mass, provided the mass has an opportunity to be thoroughly mixed with such liquid prior to being drowned in water.

The mechanism through which the benzenoid liquid influences the shade of the pigment is not clear to me. It is conceivable that the organic liquid coats the pigment particles while they are in sulfate form, and prevents their agglomeration in certain undersirable manners upon liberating the pigment in the drowning step. But I do not wish to limit my invention to any particular theories.

The phenomenon itself is sufficiently surprising, inasmuch as it has been known that the presence of organic liquids in certain acid-pasting procedures applied to certain colors of the phthalocyanine series may influence the texture of the color or the brightness of the color. But I am not aware of any instances where treatment with an organic liquid would change the very shade of the color, especially in the specific case of polychloro copper phthalocyanine. Moreover, it is not essential to retain the liquid in the final product. On the contrary, to avoid imparting to the color an objectionable odor, the added liquid is preferably removed at the end of the filtration by any convenient physical or chemical process, for instance steam distillation, or conversion into water-soluble compounds which then go out in the filtrates.

The quantity of liquid that may be used with advantage according to this invention may vary considerably. But for practical purposes it is recommended to use from about 5 to 20 parts by weight of the organic liquids for each 100 parts of the color.

Without limiting my invention, the following examples are given to illustrate my preferred mode of operation. Parts mentioned are by weight.

Example 1

1.21 parts of anhydrous sodium sulfate were dissolved in 12.7 parts of concentrated sulfuric acid (98.5% strength) at 50° to 60° C. The solution was cooled to 25° C. and 0.18 part of nitrobenzene was added, followed by 1.0 part of dry pulverized crude polychloro copper phthalocyanine and stirring. During the addition of the crude pigment, the viscosity and temperature of the mass increased abruptly. Examination of a sample at this stage under the microscope, revealed large, colorless, rod-like crystals, with oblique ends. The agitator speed was increased, and the temperature was brought back down to 25° C. After three hours agitation at 23° to 26° C., microscopic examination at 100 diameters showed that the particles of crude pigment originally present had disappeared, leaving a clear bright green field, still containing the large colorless crystals, however. The mass was then diluted carefully to an $H_2SO_4$-concentration of 94%, while keeping the temperature from rising above 35° C. After further agitation at 25° to 30° C. for 18 hours, the mass was poured into 100 parts of water, stirred for 1 hour at 70°–90° C., and filtered. The filter cake was washed with water, then slurried in 50 parts of hot water, and steam was bubbled through the mass until the odor of nitrobenzene had disappeared. After cooling to 70° C., the mass was made alkaline by addition of 0.2 part of 27% aqueous ammonia, agitated for one hour at 65° to 70° C., then filtered and washed with water until free from ammonia.

The filter cake was tested by flushing into lithographic varnish and was found to be appreciably jet, yellow and bright, and 12% stronger than a standard prepared by acid pasting polychloro copper phthalocyanine crude in a mixture of sulfuric and chlorosulfonic acids. The product of this example was appreciably yellower in shade than material prepared in the same way but omitting the nitrobenzene.

*Example 2*

The procedure was the same as in Example 1, except that the step of intermediate dilution to 94% H₂SO₄-concentration and stirring, prior to drowning, was omitted. The product was essentially of the same shade and tinctorial qualities as the product of Example 1.

*Example 3*

The procedure was the same as in Example 1, except that instead of steam distilling out the nitrobenzene, the latter was reduced in situ to acid-soluble by-products which were then eliminated in the filtrate. The actual procedure was as follows:

After the drowning step (pouring into 100 parts of water), the temperature of the slurry was adjusted to 50° C. and a solution of 1.1 parts of sodium bisulfite in 11 parts of water was run in at a uniform rate, during ½ hour. After further stirring at this temperature for 1 hour, and then for another hour at 80–85° C., the mass was filtered, and the filter cake was washed free of acid. The product, which was now free of nitrobenzene odor, was slurried in dilute ammonia (about 0.2% strength), then filtered off and washed. When flushed into lithographic varnish it was stronger and yellower than polychloro copper phthalocyanine finished by acid pasting.

*Example 4*

The procedure was the same as in Example 1, except that 0.182 part of o-dichlorobenzene was employed in lieu of the nitrobenzene therein specified. The product obtained was yellower than acid-pasted polychloro copper phthalocyanine.

*Example 5*

The procedure was the same as in Example 1, except that 0.13 part of 3° C. xylene was employed in lieu of the nitrobenzene. The product obtained was much yellower than acid-pasted polychloro copper phthalocyanine.

*Example 6*

The procedure was the same as in Example 1, except that the nitrobenzene was not introduced until about 1 hour after dilution to 94%-strength. The results were essentially the same as those obtained in Example 1.

It will be understood that the details of the above examples may be varied widely within the skill of those engaged in this art. For instance, instead of drowning the reaction mass in a large volume of water, the mass may be filtered in relatively concentrated form provided it has been diluted with water to the point where the color is liberated from its sulfate. A dilution to about 80% H₂SO₄ concentration, is generally sufficient to achieve the latter purpose. Further dilution is merely a convenience, to facilitate filtering. In general, insofar as the practice of my invention embraces materials and steps taught in the copending Barnhart application above identified, the permissible variations in the proportions or other details thereof are the same as those indicated in said copending application.

I claim as my invention:

1. In a process of improving the tinctorial qualities of crude polychloro copper phthalocyanine by stirring a slurry thereof in sulfuric acid of 98%–99% strength at a temperature between 15° C. and 35° C. and in the presence of solid crystals of a sodium sulfate-sulfuric acid complex, the improvement which consists of admixing into the slurry a liquid, benzenoid compound which is free of acidic and basic radicals, and which does not react with sulfuric acid under the specified conditions, said benzenoid liquid being added at a stage prior to the ultimate recovery of the color from said slurry.

2. An improvement as in claim 1, the added benzenoid liquid being selected from the group consisting of nitrobenzene, xylene and o-dichlorobenzene.

3. A process for improving the tinctorial qualities of crude polychloro copper phthalocyanine, which comprises suspending 1 part by weight of the color in from 3 to 20 parts by weight of sulfuric acid of 98–99% strength, which contains further the equivalent of from 5 to 20 parts by weight of Na₂SO₄ for each 100 parts of H₂SO₄, said Na₂SO₄ being partly in solution and partly in the form of complex crystals suspended in the acid, stirring said slurry of color, acid and complex crystals, at a temperature between 15° and 35° C., for a period of time not less than 1 hour, to effect conversion of the color uniformly into a physico-chemical form which presents on a slide a uniform green background when examined under a microscope, adding to the slurry a neutral benzenoid liquid from the group consisting of nitrobenzene, xylene and o-dichlorobenzene, in quantity corresponding by weight to between 5 and 20% based on the weight of the color, and finally diluting the slurry with water and recovering the color.

4. A process for improving the tinctorial qualities of crude polychloro copper phthalocyanine, which comprises suspending 1 part by weight of the color and from 0.05 to 0.20 part by weight of a benzenoid organic liquid from the group consisting of nitrobenzene, xylene and o-dichlorobenzene in from 3 to 20 parts by weight of sulfuric acid of 98–99% strength, which contains further the equivalent of from 5 to 20 parts by weight of Na₂SO₄ for each 100 parts of H₂SO₄, said Na₂SO₄ being partly in solution and partly in the form of complex crystals suspended in the acid, stirring said slurry of color, acid and complex crystals, at a temperature between 15° and 35° C., for a period of time not less than 1 hour, to effect conversion of the color uniformly into a physico-chemical form which presents on a slide a uniform green background when examined under a microscope, and subsequently recovering the color from said slurry by diluting the latter with water and filtering.

5. A process as in claim 3, wherein the recovered color is then reslurried in water and the slurry is subjected to steam distillation until the odor of the added benzenoid liquid has disappeared.

6. A process as in claim 4, wherein the recovered color is then reslurried in water and the slurry is subjected to steam distillation until the odor of the added benzenoid liquid has disappeared.

References Cited in the file of this patent

UNITED STATES PATENTS

| | | |
|---|---|---|
| 2,278,973 | Carr | Apr. 7, 1942 |
| 2,284,685 | Detrick | June 2, 1942 |
| 2,402,167 | Lang | June 18, 1946 |
| 2,524,672 | Lecher | Oct. 3, 1950 |
| 2,556,730 | Graham | June 12, 1951 |

OTHER REFERENCES

F. I. A. T., Report No. 1313, vol. III, pp. 297–303, PB 85,172.